(12) United States Patent
Kruglick

(10) Patent No.: US 9,853,989 B2
(45) Date of Patent: *Dec. 26, 2017

(54) SMART POWER BACKGROUND TO VALIDATE USER

(71) Applicant: EMPIRE TECHNOLOGY DEVELOPMENT LLC, Wilmington, DE (US)

(72) Inventor: Ezekiel Kruglick, Poway, CA (US)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 15/017,982

(22) Filed: Feb. 8, 2016

(65) Prior Publication Data
US 2016/0156651 A1     Jun. 2, 2016

Related U.S. Application Data

(63) Continuation of application No. 14/352,655, filed as application No. PCT/US2013/057109 on Aug. 28, 2013, now Pat. No. 9,306,963.

(51) Int. Cl.
H04L 29/06        (2006.01)
G08B 13/22        (2006.01)

(52) U.S. Cl.
CPC .......... H04L 63/1416 (2013.01); G08B 13/22 (2013.01); H04L 63/08 (2013.01);
(Continued)

(58) Field of Classification Search
None
See application file for complete search history.

(56) References Cited

U.S. PATENT DOCUMENTS 8,583,520 B1    11/2013  Forbes, Jr.
2010/0210280 A1  8/2010  Haynes et al.
(Continued)

OTHER PUBLICATIONS

"Akamai CEO Discusses Q3 2010 Results—Earnings Call Transcript," accessed at http://seekingalpha.com/article/232845-akamai-ceo-discusses-q3-2010-results-earnings-call-transcript?part=single, Oct. 27, 2010, pp. 1-15.
(Continued)

*Primary Examiner* — Benjamin Lanier
(74) *Attorney, Agent, or Firm* — Turk IP Law, LLC

(57) ABSTRACT

Technologies are generally described to implement intrusion detection based on smart power background. In some examples, upon detection of an attempt to access a resource, a power line ambiance may be determined at a location of a device on which the attempt to access the resource is executed. The power line ambiance may be based on a connection of the device and/or one or more other devices at the location to a power line. The captured/received power profiles may identify device signatures enabling generation of a digest of the location. An intrusion detection system (IDS), may receive the digest of the location and compare the digest to previous digests associated with an authorized client of the resource to evaluate an authenticity of the attempt. If the authenticity of the attempt is suspicious, the IDS may elevate security by employing one or more verification levels and/or one or more authentication techniques.

20 Claims, 7 Drawing Sheets

(52) U.S. Cl.
CPC .......... *H04L 63/14* (2013.01); *H04L 63/1441* (2013.01); *H04L 67/42* (2013.01)

(56) References Cited

U.S. PATENT DOCUMENTS

| | | |
|---|---|---|
| 2010/0306533 A1 | 12/2010 | Phatak |
| 2010/0311436 A1 | 12/2010 | Bevan et al. |
| 2011/0202198 A1 | 8/2011 | Venkatakrishnan et al. |
| 2012/0198551 A1 | 8/2012 | Whitney |
| 2012/0271574 A1 | 10/2012 | Williams, Jr. et al. |
| 2012/0314868 A1 | 12/2012 | Bernheim et al. |
| 2013/0231795 A1 | 9/2013 | G et al. |
| 2013/0254881 A1 | 9/2013 | Helmschmidt et al. |

OTHER PUBLICATIONS

"Call for Papers," accessed at http://sgc2016.ieee-smartgridcomm.org/8.html, accessed on Jan. 12, 2016, p. 1.

"Demand Response Programs," accessed at http://regarchivesdge.com/aboutus/longterm/longtermDemandResponse.shtml, accessed on Jan. 11, 2016, pp. 2.

"Sarah Palin email hack," Wikipedia, accessed at http://web.archive.org/web/20130814000215/http://en.wikipedia.org/wiki/Sarah_Palin_email_hack, last modified Jul. 19, 2013, pp. 5.

"Summer Saver Program," accessed at http://www.sdge.com/save-money/summer-saver-program, accessed on Jan. 11, 2016, pp. 7.

"Telemetry scenario: Home energy monitoring and control," accessed at http://publib.boulder.ibm.com/infocenter/wmqv7/v7r1/indexjsp?topic=%2Fcom.ibm.mq.doc%2Ftt10200_.htm, accessed on Jan. 12, 2016, pp. 3.

Alizadeh, M., et al., "Direct Load Management of Electric Vehicles," IEEE International Conference on Acoustics, Speech and Signal Processing ICASSP, pp. 1-20 (May 2011).

Alizadeh, M., et al., "From Packet to Power Switching: Digital Direct Load Scheduling," Accepted by The IEEE Journal of Selected Areas in Communications (JSAC): Smart Grid Communications Series, to Appear, pp. 1-10 (Feb. 15, 2012).

Cole, A. I., et al., "Algorithm for nonintrusive identification of Residential Appliances," Proceedings of the 1998 IEEE International Symposium on Circuits and Systems, vol. 3, pp. 338-341 (May 31-Jun. 3, 1998).

Dhage, S.N., et al., "Intrusion detection system in cloud computing environment," Proceedings of the International Conference & Workshop on Emerging Trends in Technology (ICWET 2011 ), pp. 235-239 (2011).

Drenker, S., et al., "Nonintrusive monitoring of electric loads," IEEE Computer Applications in Power, vol. 12, Issue 4, pp. 47-51 (Oct. 1999).

Hart, G. W., "Nonintrusive appliance load monitoring," Proceedings of the IEEE, vol. 80, Issue 12, pp. 1870-1891 (Dec. 1992).

Honan, M., "How Apple and Amazon Security Flaws Led to My Epic Hacking," accessed at http://www.wired.com/2012/08/apple-amazon-mat-honan-hacking/all/, Aug. 6, 2012, pp. 20.

International Search Report and Written Opinion for PCT Application No. PCT/US2013/057109, dated Jan. 22, 2014.

Knott, J., "Powerline Leading Smart Grid Appliance Protocol," accessed at http://web.archive.org/web/20110628174224/http://www.cepro.com/article/powerline_leading_smart-grid_appliance_protocol/, Mar. 8, 2011, pp. 3.

Matthews, T., "Passwords Are Not Enough: Why Enterprises Need Strong Authentication, Too," accessed at http://web.archive.org/web/20130303193943/http://www.infosectoday.com/Articles/Strong_Authentication.htm, accessed on Mar. 3, 2013, pp. 2.

Prudenzi, K., "A neuron nets based procedure for identifying domestic appliances pattern-of-use from energy recordings at meter panel," IEEE Power Engineering Society Winter Meeting, vol. 2, pp. 941-946 (Jan. 2002).

Rankin, K, "Hack and /—Password Cracking with GPUs, Part 1: The Setup," accessed at http://web.archive.org/web/20130814152440/http://www.linuxjournal.com/content/hack-and-password-cracking-gpus-part-i-setup, Aug. 14, 2013, pp. 6.

Revett, K, S., et al., "Enhancing Login Security Through the Use of Keystroke Input Dynamics," Advances in Biometric, Lecture Notes in Computer Science, vol. 3832, pp. 661-667 (Jan. 2005).

Sultanem, F., "Using appliance signatures for monitoring residential loads at meter panel level," IEEE Transactions on Power Delivery, vol. 6, Issue 4, pp. 1380-1385 (Oct. 1991).

SMART POWER BACKGROUND TO VALIDATE USER

CROSS-REFERENCE TO RELATED APPLICATIONS

This Application is a continuation application under 35 U.S.C. §120 of U.S. patent application Ser. No. 14/352,655 filed on Apr. 17, 2014, now issued as U.S. Pat. No. 9,306, 963, which is the U.S. National Stage filing under 35 U.S.C. §371 of International Application No. PCT/US2013/057109 filed on Aug. 28, 2013. The disclosures of U.S. patent application Ser. No. 14/352,655 and International Application No. PCT/US2013/057109 are hereby incorporated by reference in their entireties.

BACKGROUND

Unless otherwise indicated herein, the materials described in this section are not prior art to the claims in this application and are not admitted to be prior art by inclusion in this section.

Within a network environment, passwords are a common security technique implemented to authorize a user to gain access to his/her accounts. However, passwords alone may not be sufficient. Breaches are occurring more frequently, exposing a multitude of passwords. Even repositories of encrypted passwords may be exposed relatively quickly by employing brute force algorithms and graphic processing units (GPUs). In addition, users may be unable to remember a large number of unique passwords. As a result, every breach may also have a few passwords shared with other important accounts that may expose sensitive information, such as corporate, financial, and medical data. Personal data is increasingly available and more accounts may be interconnected due to the cloud infrastructure, further easing the ability for a hacker to obtain access to information.

In response to the growing password security concerns, the cloud management community has implemented intrusion detection systems (IDSs). An IDS may use collateral data about a connection to evaluate an appropriate security level. For example, if all previous online banking sessions have occurred in Seattle and a session then occurs in Albania in which all money is transferred to Moscow, the system may evaluate the action as suspicious and implement further security, even if the password is correct. An IDS is based on concepts of different channels of verification, where each channel is a separate source of information about a user. One channel may be a password and another channel may be an asserted identity, for example. Each channel alone may be insufficient to evaluate a likelihood that a user is unauthorized, but together each channel may improve the probability of accurately determining the credibility of the user.

SUMMARY

The present disclosure generally describes techniques to implement intrusion detection based on smart power background.

According to some examples, a method to implement intrusion detection is provided. An example method may include determining a power line ambiance at a location of a device on which an attempt to access a resource is executed, the power line ambiance based on a connection of the device and one or more other devices to a power line. The method may also include generating a digest based on the power line ambiance, where the digest may allow for authentication of the attempt to access the resource.

According to other examples, a method to implement intrusion detection based on smart power background is provided. An example method may include detecting an attempt to access a resource and receiving a digest associated with a location of a device on which the attempt to access the resource is executed. The method may also include comparing the received digest to previous digests associated with an authorized client of the resource and evaluating an authenticity of the attempt based on the comparison of the digest to the previous digests associated with the authorized client of the resource.

According to further examples, a system to implement intrusion detection is described. An example system may include a smart meter and a power grid server coupled to the smart meter. The power grid server may be configured to determine a power line ambiance at a location of a device on which an attempt to access a resource is executed, the power line ambiance based on a connection of the device and one or more other devices to a power line through the smart meter. The power grid server may also be configured to generate a digest based on the power line ambiance, where the digest allows for authentication of the attempt to access the resource.

According to some embodiments, a system to implement intrusion detection based on smart power background is described. The example system may include one or more servers of an intrusion detection system (IDS) configured to communicate with a device, a smart meter, and/or a power grid server. The servers of the IDS may be configured to detect an attempt to access a resource and receive a digest associated with a location of a device on which the attempt to access the resource is executed. The servers of the IDS may be also configured to compare the received digest to previous digests associated with an authorized client of the resource and evaluate an authenticity of the attempt based on a comparison of the digest to the previous digests associated with the authorized client of the resource.

According to other embodiments, a computer-readable memory device with instructions stored thereon is described, which when executed on one or more computing devices may execute a method to implement intrusion detection. The method may be similar to the example methods provided above.

According to further embodiments, a computer-readable memory device with instructions stored thereon is described, which when executed on one or more computing devices may execute a method to implement intrusion detection based on smart power background. The method may be similar to the example methods provided above.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
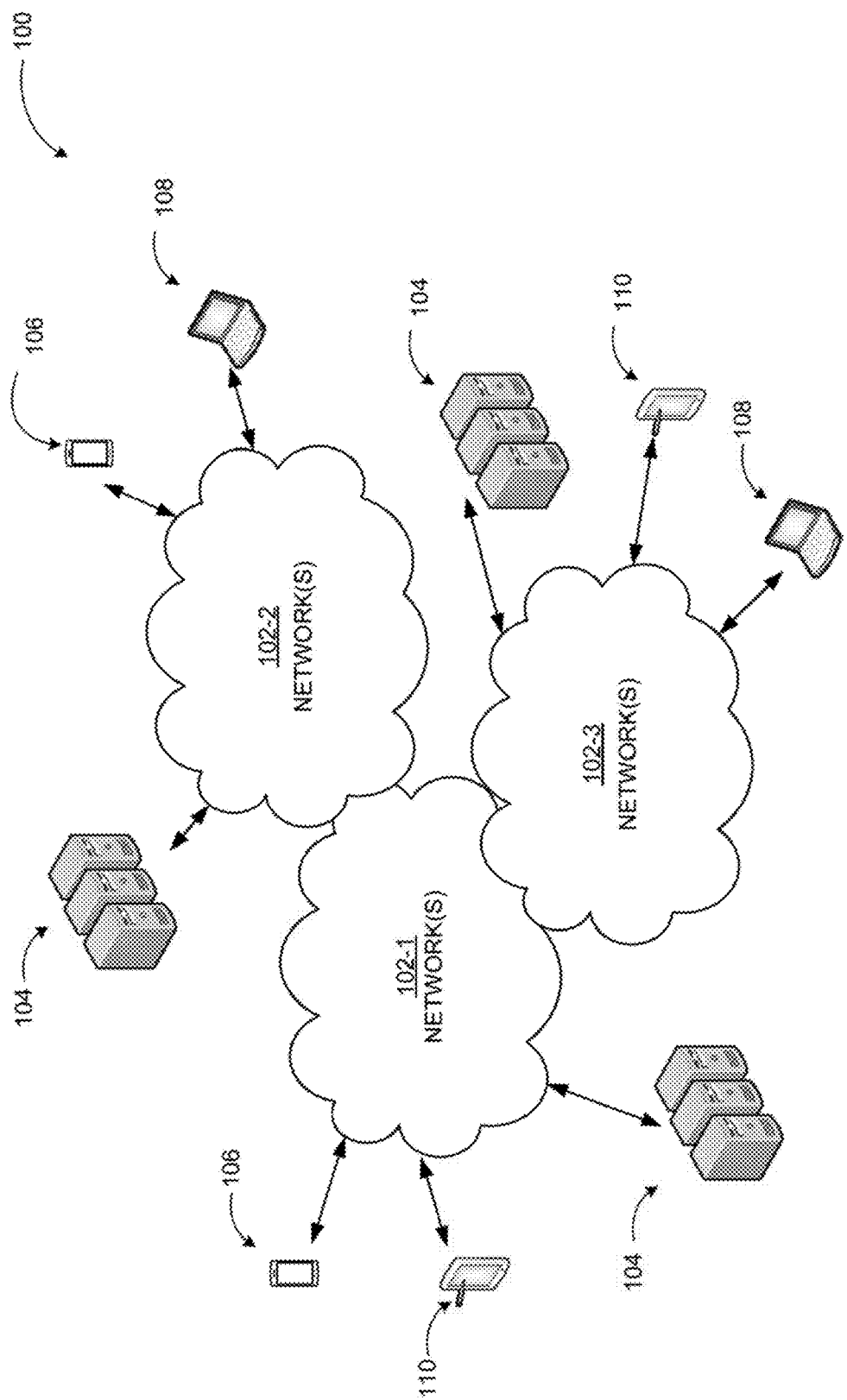
FIG. 1 illustrates a networked environment in which intrusion detection based on smart power background may be implemented.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to implementation of intrusion detection based on smart power background.

Briefly stated, technologies are generally described to implement intrusion detection based on smart power background. In some examples, upon detection of an attempt to access a resource, a power line ambiance may be determined at a location of a device on which the attempt to access the resource is executed. The power line ambiance may be based on a connection of the device and/or one or more other devices at the location to a power line. The captured/received power profiles may identify device signatures enabling generation of a digest of the location. An intrusion detection system (IDS), may receive the digest of the location and compare the digest to previous digests associated with an authorized client of the resource to evaluate an authenticity of the attempt. If the authenticity of the attempt is suspicious, the IDS may elevate security by employing one or more verification levels and/or one or more authentication techniques.

A power line ambiance, as described herein, may be a power profile of a location of a device on which an attempt to access a resource is executed, for example, one or more devices connected to the power line at the location. A power profile, as described herein, may be an identification of a device contributing to a power line ambiance such as a broadcast identification, power consumption of the one or more devices connected to the power line at the location, a noise associated with a device contributing to a power line ambiance, transmission patterns, and/or other characteristics associated with power line connection of the device contributing to a power line ambiance. A smart device, as described herein, may be a device that may communicate with one or more other devices, servers, systems, etc. over the power line and may provide information about itself to the one or more other devices, servers, systems, etc. A non-smart device, as described herein, may be a device that may not communicate with other devices, servers, systems, etc. over the power line and may not be able to provide information about itself to the other devices, servers, systems, etc.

FIG. 1 illustrates a networked environment in which intrusion detection based on smart power background may be implemented, arranged in accordance with at least some embodiments described herein.

As shown in a diagram 100, intrusion detection may be implemented over one or more servers 104 or a single server (e.g., web server) such as a hosted service. An intrusion detection system (IDS) implemented on the one or more servers 104 may communicate with computing devices such as a smart phone 106, a laptop computer 108, or a tablet computer 110 through one or more network(s) 102-1, 102-2, and 102-3. The network(s) 102-1, 102-2, and 102-3 may include a telecommunications network and a power grid network, for example.

In one embodiment, a power line ambiance may be determined upon detection of an attempt to access a resource on a computing device, the power line ambiance based on a connection of one or more devices to a power line at a location of the computing device. To determine the power line ambiance, identification or power profiles of the devices may be captured at the location of the computing device by a smart meter and/or a power grid server coupled to the devices. Power profiles captured at the location may enable identification of smart and/or non-smart device signatures. The smart and/or non-smart device signatures may be identified passively using power consumption data or actively using impulse response data. A digest may then be generated based on the device signatures identified from the power line ambiance and provided to the IDS to evaluate an authenticity of the attempt. If the attempt is authentic the digest may be stored in the IDS as a digest associated with an authorized client of the resource. If the attempt is suspicious, one or more verification levels and/or authentication techniques may be employed to elevate security.

IDS systems for important secure data may track the detailed progression of a user's electrical profile over time, for example noting specific appliance IDs and broadcast information to generate detailed expectations that can be used to complement other security detection channels.

The network(s) 102-1, 102-2, and 102-3 may comprise any topology of servers, clients, Internet service providers, and communication media. A system according to embodiments may have a static or dynamic topology. The network (s) 102-1, 102-2, and 102-3 may include secure networks such as an enterprise network, an unsecure network such as a wireless open network, or the Internet. The network (s) 102-1, 102-2, and 102-3 may also coordinate communication over other networks such as Public Switched Telephone Network (PSTN) or cellular networks. Furthermore, the network(s) 102-1, 102-2, and 102-3 may include short range wireless networks such as Bluetooth or similar ones. The network(s) 102-1, 102-2, and 102-3 may provide communication between the nodes described herein. By way of example, and not limitation, the network(s) 102-1, 102-2, and 102-3 may include wireless media such as acoustic, radio frequency (RF), infrared and other wireless media.

Many other configurations of computing devices, applications, data sources, and data distribution systems may be employed for intrusion detection based on smart power background. Furthermore, the networked environments discussed in FIG. 1 are for illustration purposes only. Embodiments are not limited to the example applications, modules, or processes.

Figure 2:
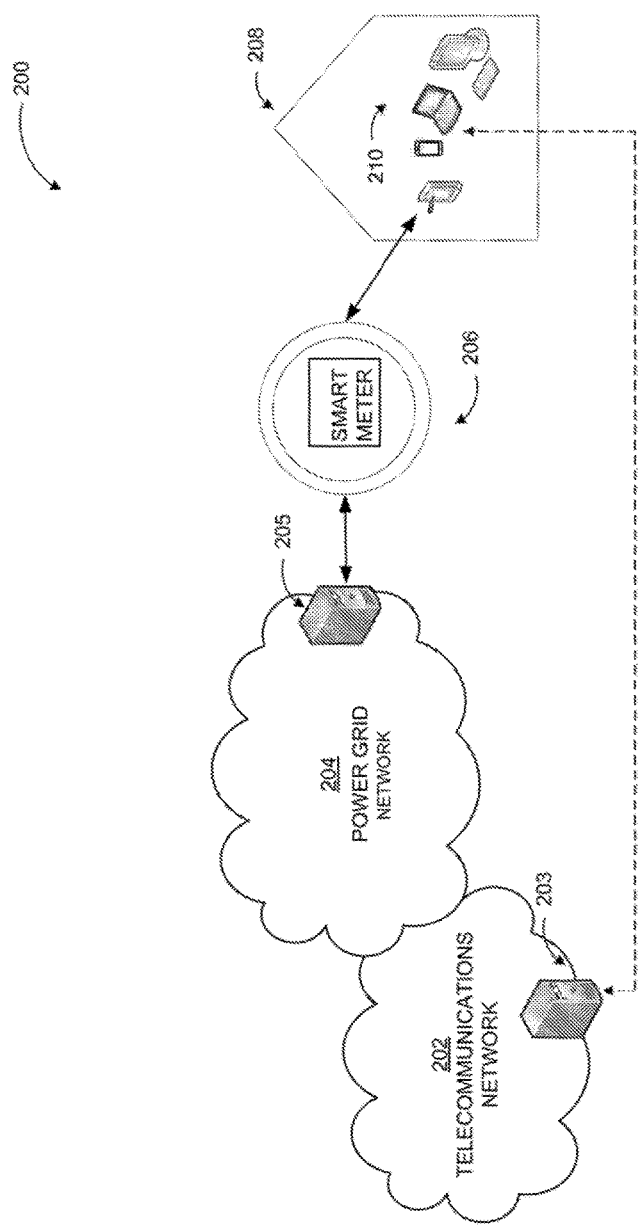
FIG. 2 illustrates an example of a smart power grid system employed to determine a power line ambiance at a location of a device on which an attempt to access a resource is executed.

FIG. 2 illustrates an example of a smart power grid system employed to determine a power line ambiance at a location of a device on which an attempt to access a resource is executed, arranged in accordance with at least some embodiments described herein.

As shown in a diagram 200, a telecommunications network 202 may be coupled to a power grid network 204, each network including one or more servers, 203 and 205, respectively. The power grid network 204 may supply power to a multitude of devices 210, for example, a laptop, a computer, a smart phone, a tablet, and other electronic devices at a particular location for each device. The multitude of devices 210 may include a client device, such as the laptop. The multitude of devices 210 may also be in communication with the telecommunications network 202. Power supplied to one device, such as the laptop, may be distinct from the power supplied to another device, such as the smart phone. The difference in power supplied may be due to the type of device, how much power the device consumes, or usage of the device, the difference enabling each device to have a unique device signature.

Upon detection of an attempt to access a resource, a smart meter 206 coupled to the one or more servers 205 of the power grid network may allow determination of a power line ambiance at a location 208 of a device on which the attempt to access the resource is executed. For example, if an attempt to access an online credit card account is executed on the client device, the laptop, at a home of the client, the power line ambiance may be determined for the home. The power line ambiance may be based on a connection of the multitude of devices 210 to a power line through the smart meter 206 at the location 208, such as the home of the client. The power line ambiance may be determined by capturing the power profiles of the multitude of devices 210 at the location 208 to identify smart and/or non-smart device signatures. The signatures may be identified passively using power consumption data or actively using impulse response data and used to generate a digest associated with the home of the client. The digest may be provided to an IDS system which may determine the attempt to access the resource as authentic, the attempt made by an authorized client, and store the digest associated with the authorized client of the resource in one or more servers of the IDS.

Modern smart power grid systems and standards may conduct significant amounts of sensing and signaling. Smart meters on each home may identify device types and behaviors to detect a signature passively or actively. The smart meters may further be designed to send Demand Side Management (DSM) type signals into power lines. For example, in some U.S. cities, a user may be paid for allowing the power company to employ air conditioner smart managers to turn off the user's air conditioners during times of very high power load.

Smart power grid systems may further implement power line chips, which are cost effective at less than a dollar per chip. Current power management chips built into chargers may have smart-power messaging built into the chips such that an additional ability to interpret smart-power messages may have zero incremental cost for any device or system that does voltage conversion. As a result, implementing the smart-power messaging into power line chips may allow feasibility for almost any device to collect data on smart and/or non-smart devices on a local smart power grid downstream of the nearest smart meter.

Figure 3:
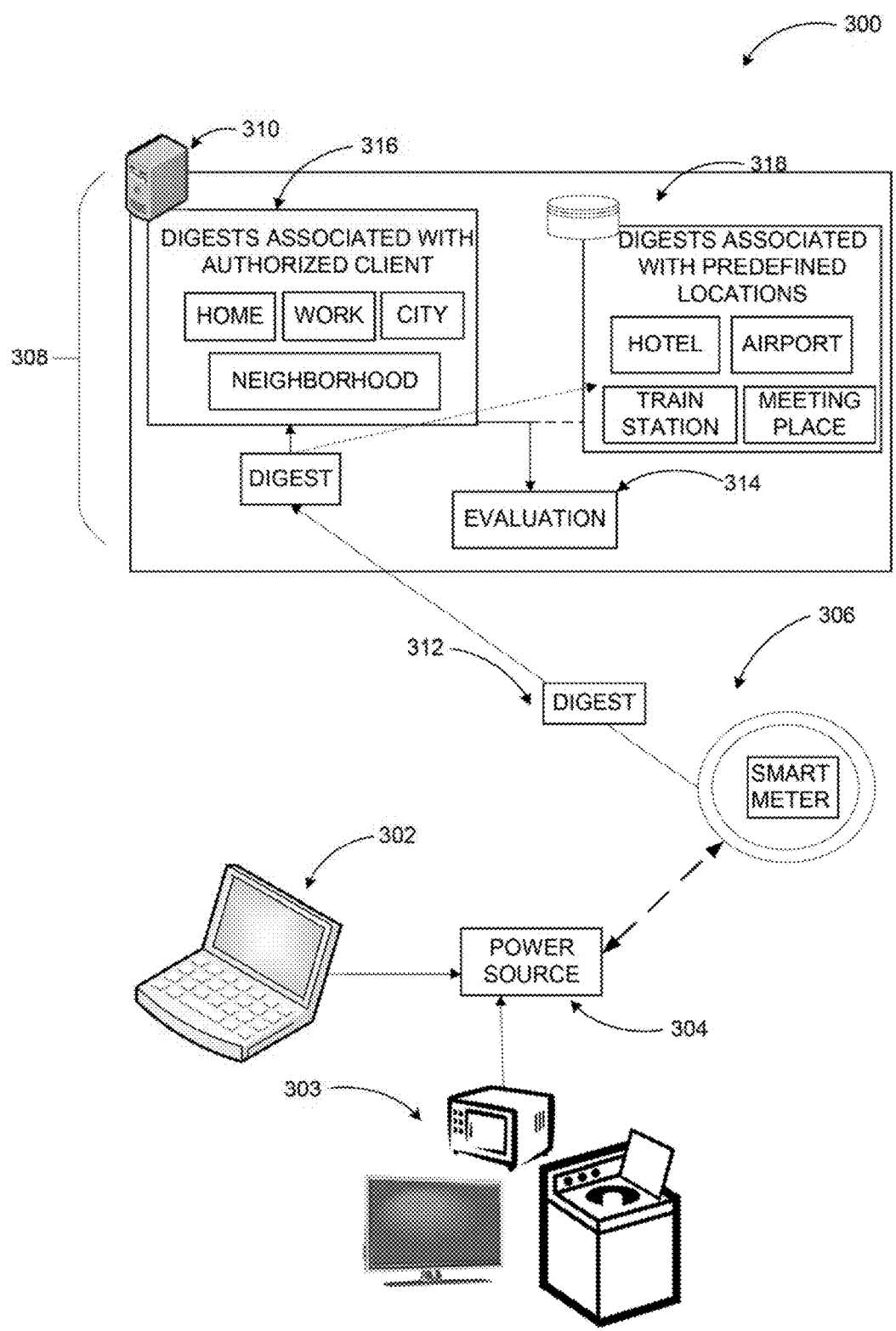
FIG. 3 illustrates an example system to implement intrusion detection based on smart power background.

FIG. 3 illustrates an example system to implement intrusion detection based on smart power background, arranged in accordance with at least some embodiments described herein.

As shown in a diagram 300, the system, according to embodiments, may include a device 302, a power source 304 coupling the device to a smart meter 306, and an IDS 308. The IDS 308 may include one or more servers 310 configured to evaluate an authenticity of an attempt to access a resource. The power source 304 may also couple one or more other devices 303 to the smart meter 306 at a same location of the device 302.

The IDS 308 may detect the attempt to access the resource on the device 302. For example, a web login page to access a personal account of a client may be activated. Upon request from the IDS 308, the smart meter 306 may determine a power line ambiance at a location of the device 302 by providing data associated with power profiles of the device 302 and one or more other devices 303 connected to a power line through the power source 304. The other devices 303 may include appliances, such as a television, a microwave, a washer, a dryer, or other appliance. The power line ambiance may identify smart and/or non-smart device signatures from the captured profile and the device signatures may be used to generate a digest 312 associated with the location based on the determined power line ambiance. The generated digest 312 may then be received by the IDS 308, provided by the smart meter 306.

In an alternate embodiment, a device may execute an application, such as a power line monitoring application, to generate a digest based on a power line ambiance, the power line ambiance based on a connection of one or more devices to a power line. The power line monitoring application may be delivered and embedded into the device by an IDS. For example, the power line monitoring application may be delivered as an embedded application into a user web login session. The power line monitoring application may then deliver the digest to the IDS.

Once the digest 312 is received by the IDS 308, the servers 310 may evaluate the authenticity by comparing the digest 312 to digests associated with an authorized client of the resource 316 previously received by the IDS 308. The previous digests may have been generated using a same method as described in FIG. 1, and stored in the IDS 308 upon evaluating the digests as authentic. For example, the digests may be associated with a home, an office, a neighborhood, a city or other similar location in which the authorized client may have accessed the resource previously.

The servers 310 may also refer the digest 312, if unrecognized after comparison to the digests associated with the authorized client of the resource 316, to a search engine database to compare the digest 312 to digests associated with predefined locations 318. The digests associated with the predefined locations 318 may have additionally been generated using the same method as described in FIG. 1. The predefined locations may include a hotel, an airport, a meeting place, a healthcare facility, an educational facility, a train station, and other predefined locations in which a user may be able to use devices to access a resource. The search engine may be assisted by network effects (e.g., more clients) and may be a remote shared repository.

The comparisons of the digest 312 to the digests associated with the authorized client of the resource 316 and/or the digests associated with predefined locations 318 may be used to generate an evaluation 314. The IDS 308 may use the evaluation as an additional channel to consider the authorization of a login. If the evaluation on the authenticity of the attempt to access the resource is suspicious, the IDS 308 may further evaluate the authenticity by employing one or more verification levels and/or one or more authentication techniques to elevate security.

The authentication techniques may include a password, an asserted identity, a characterization of typing speed and delays, a location of Internet Protocol (IP) address, hardware fingerprinting, local weather events, local power events, activation of one or more previously associated devices or appliances of a known power signature, and/or another similar authentication technique. One verification level may include comparison of digests for users attempting to access the resource from a same location. Another level may include retrieval and evaluation of external information associated with the location of the device on which the attempt to access the resource is executed. A user attempting to access the resource may additionally be prompted to provide the external information.

In some examples, external information may be retrieved to verify the location associated with the digest. The external information may include weather information associated with the location, a power event associated with the location, and power signatures of known devices from the location. There may be multiple application programming interfaces (APIs) available to receive local sunset times and weather based on location, and power consumption of devices such as lights and air conditioning may correlate to the external information.

For example, if retrieved external information indicates current outside temperature in the location is below freezing, but a digest associated with the location reveals power consumption by an air conditioner, the evaluation may indicate a suspicion of lack of authenticity. A hacker may have obtained power profile data from a client and may be trying a replay attack of data taken on another day. In response to the suspicion, another level of verification may be implemented by the IDS to evaluate the authenticity. For example, a user attempting to access the resource may be prompted to activate one or more devices associated with a previous digest or with a known power signature connected to the power line. For example, a device on which the attempt is executed may request that the user plug in a phone charger, electric razor, or other device that has been associated with the user's power profile in previous digests associated with an authorized client received by the IDS.

In another example, a digest received by the IDS may indicate a user attempting to access a resource on a device at a home location of an authorized client of the resource, but other elements may raise security concerns. For example, a large number of attempts may be made to login and/or a typing characterization may be different from the authorized client. The IDS may elevate security by prompting the user attempting to access the resource to turn on a device with a known power signature in previous digests associated with the home of the authorized client received by the IDS. For example, several missed passwords may prompt a request to "please turn on your specific brand and/or type TV" or "please start a washing machine to validate your home."

Hackers may set up a generator, a regionally appropriate and fully patched smart meter, and rooms full of specific devices or device simulators to overcome the proposed method of intrusion detection. However, they may still fail if they don't know which particular type of TV or washing machine an authorized client has. The above implementation may allow the IDS to elevate security by confirming a known client device along with a password or the like, fulfilling the standard two-factor verification requirement for Payment Card Industry (PCI) or government security.

In some examples, locations such as workplaces or hotels may offer an additional layer of security by broadcasting information on the power lines using wired connection and supplying those random numbers to an IDS server. This may allow a resource manager to establish that access attempts to a resource (e.g., logins) are likely in a particular building or to establish that a user is likely at a location like a hotel that broadcasts codes (e.g., for corporate guests). Broadcasting codes onto the electrical system may also be used for other implementations such as employers providing their employees with small plug-in units to make their home an "allowed" place to log in.

Figure 4:
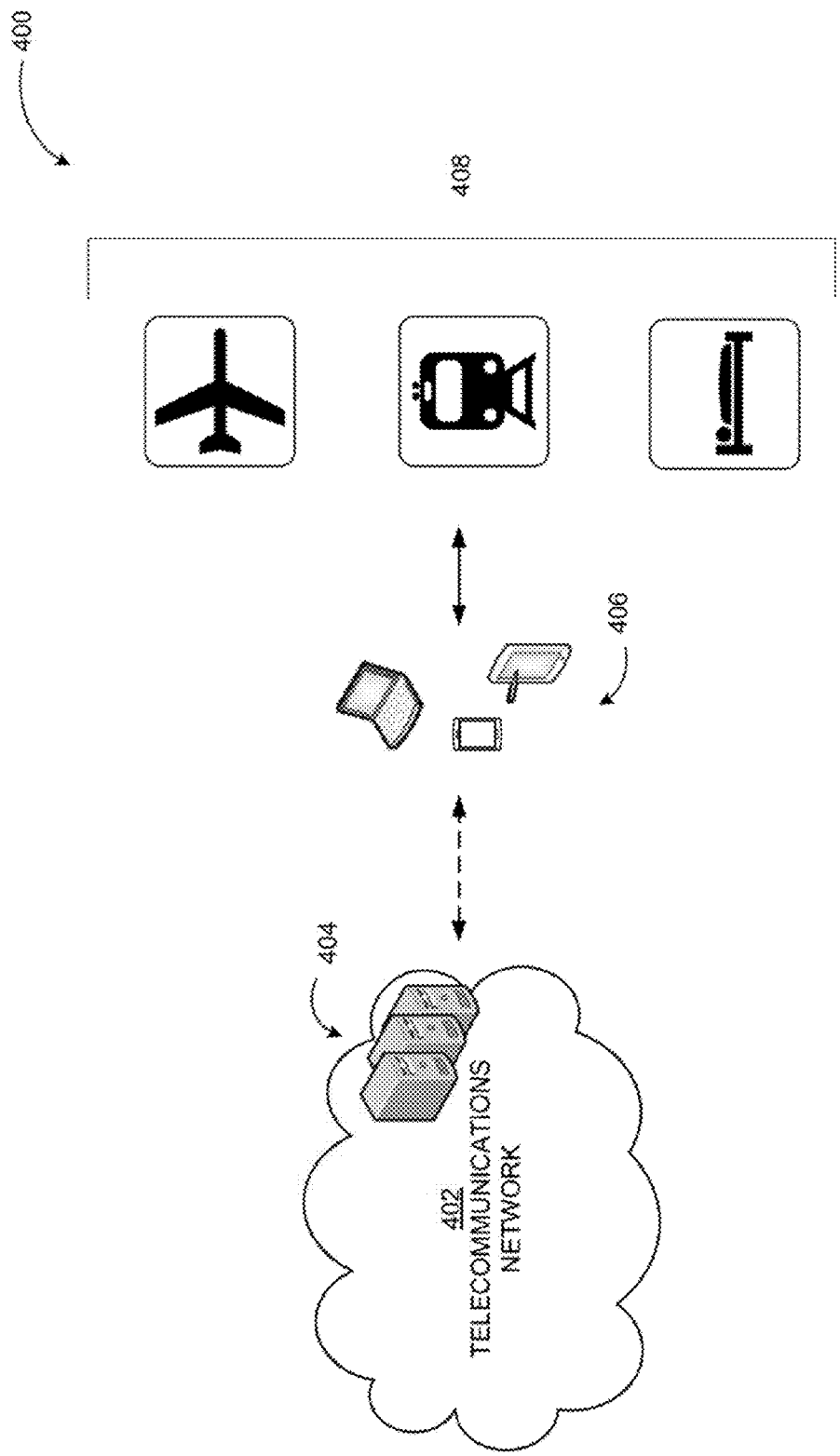
FIG. 4 illustrates an example to determine power line ambiances at predefined locations to generate one or more digests associated with the predefined locations.

FIG. 4 illustrates an example to determine power line ambiances at predefined locations to generate one or more digests associated with the predefined locations, arranged in accordance with at least some embodiments described herein.

As shown in a diagram 400, one or more devices 406, associated with predefined locations 408, may be in communication with a telecommunications network 402, the telecommunications network 402 including one or more servers 404 of an IDS. The one or more devices 406 may include a laptop, a smart phone, a tablet, or other similar device. The predefined locations 408 may be a company, an airport, a train station, a hotel, a healthcare facility, an educational facility, a meeting place, or any other location in which a device may be used to attempt to access a resource.

Power line ambiances associated with the predefined locations 408 may be determined using the methods described in FIG. 1-3 to generate one or more digests associated with the predefined locations 408. The one or more servers 404 of the IDS may receive the digests associated with the predefined locations 408. The digests may be stored in a search engine database associated within the IDS. The IDS may receive a digest associated with a location of a device on which an attempt is executed that is unrecognizable after comparison to previous digests associated with an authorized client of the resource. In response, the IDS may execute the search engine to compare the unrecognized digest to the digests stored within the search engine database. The search engine may be assisted by network effects (e.g., more clients) and may be a remote shared repository. If the user login is determined to be authentic, location information from a user device may become associated with the digest in a record to aid in identifying the location if a similar digest is received later by the IDS.

For example, an attempt to access an online health insurance account may be executed on the laptop at the hotel. A power line ambiance of the hotel may be determined based on the laptop and one or more other devices, such as a television, a telephone, or other appliance at the hotel, connected to a power line at the hotel. The captured power profiles of the laptop and the other devices may identify smart and/or non-smart device signatures used to generate a digest associated with the hotel. The digest associated with the hotel may be received by the IDS and stored in a search engine database.

The IDS may receive a digest associated with a location of a smartphone on which an attempt to access an online bank account is executed. If the digest is not recognizable after comparison to previous digests associated with an authorized client of the bank account, the IDS may execute the search engine database and compare the digest to one or more digests associated with predefined locations 408, such as the hotel.

Figure 5:
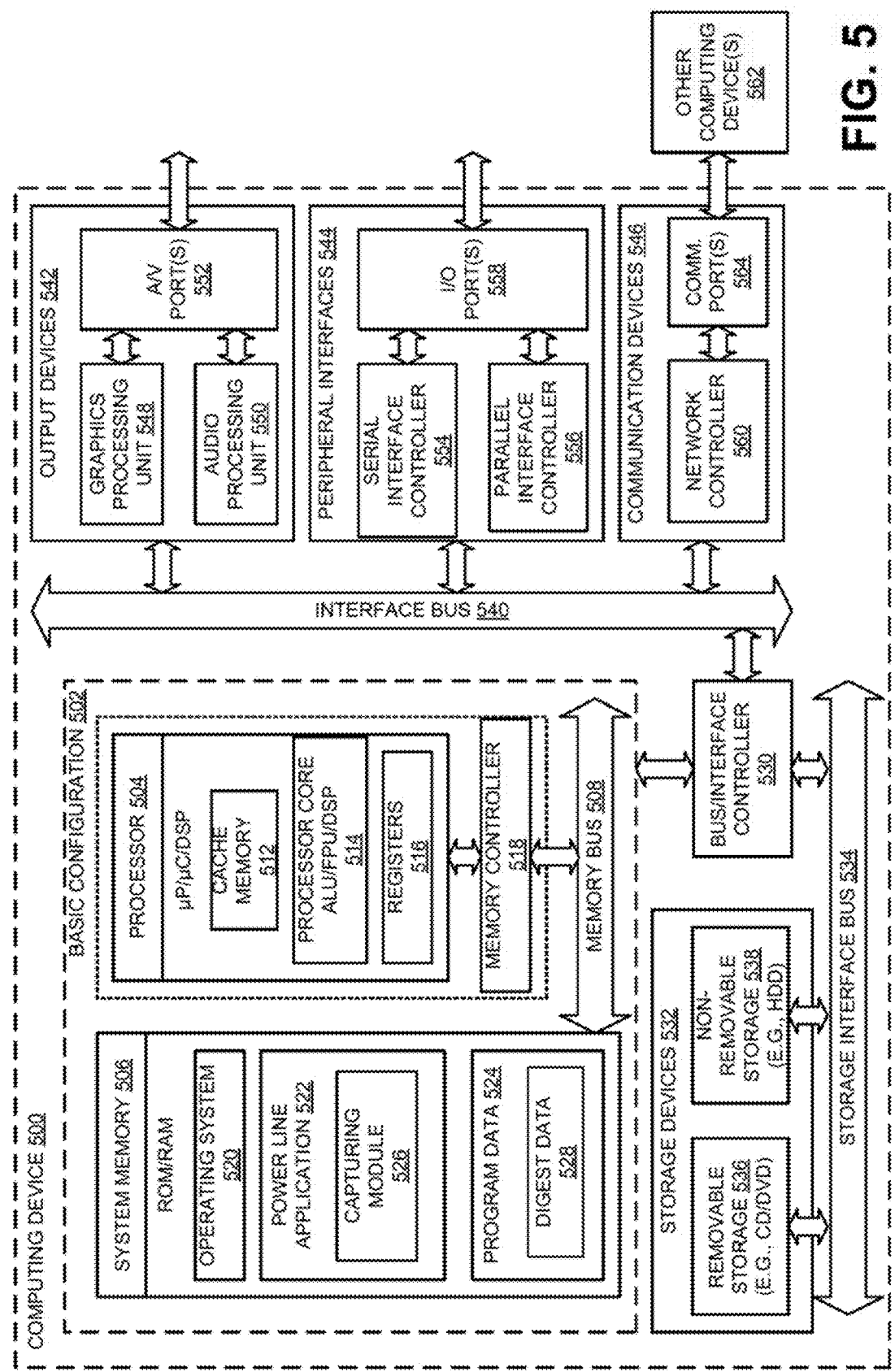
FIG. 5 illustrates a general purpose computing device, which may be used to implement intrusion detection based on smart power background.

FIG. 5 illustrates a general purpose computing device, which may be used to implement intrusion detection based on smart power background, arranged in accordance with at least some embodiments described herein.

For example, the computing device 500 may be used as a server, desktop computer, portable computer, smart phone, special purpose computer, or similar device such as a controller, a new component, a cluster of existing components in an operational system including a vehicle and a smart dwelling. In an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including but not limited to a microprocessor (µP), a microcontroller (µC), a digital signal processor (DSP), or any combination thereof. The processor 504 may include one or more levels of caching, such as a cache memory 512, one or more processor cores 514, and registers 516. The example processor cores 514 may (each) include an arithmetic logic unit (ALU), a floating point unit (FPU), a digital signal processing core (DSP core), or any combination thereof. An example memory controller 518 may also be used with the processor 504, or in some implementations, the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, a power line application 522, and program data 524. The power line application 522 may include a capturing module 526, which may be an integral part of the application or a separate application on its own. The capturing module 526 may capture power profiles of one or more devices connected to a power line through a smart meter, which may be used to identify devices signature and generate a digest. The program data 524 may include, among other data, digest data 528 related to the digest generated based on the power line ambiance, as described herein.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVDs), solid state drives (SSDs), or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (e.g., one or more output devices 542, one or more peripheral interfaces 544, and one or more communication devices 546) to the basic configuration 502 via the bus/interface controller 530. Some of the example output devices 542 include a graphics processing unit 548 and an audio processing unit 550, which may be configured to communicate to various external devices such as a display or speakers via one or more A/V ports 552. One or more example peripheral interfaces 544 may include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564. The one or more other computing devices 562 may include servers, client devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Example embodiments may also include methods to implement intrusion detection based on smart power background. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 6:
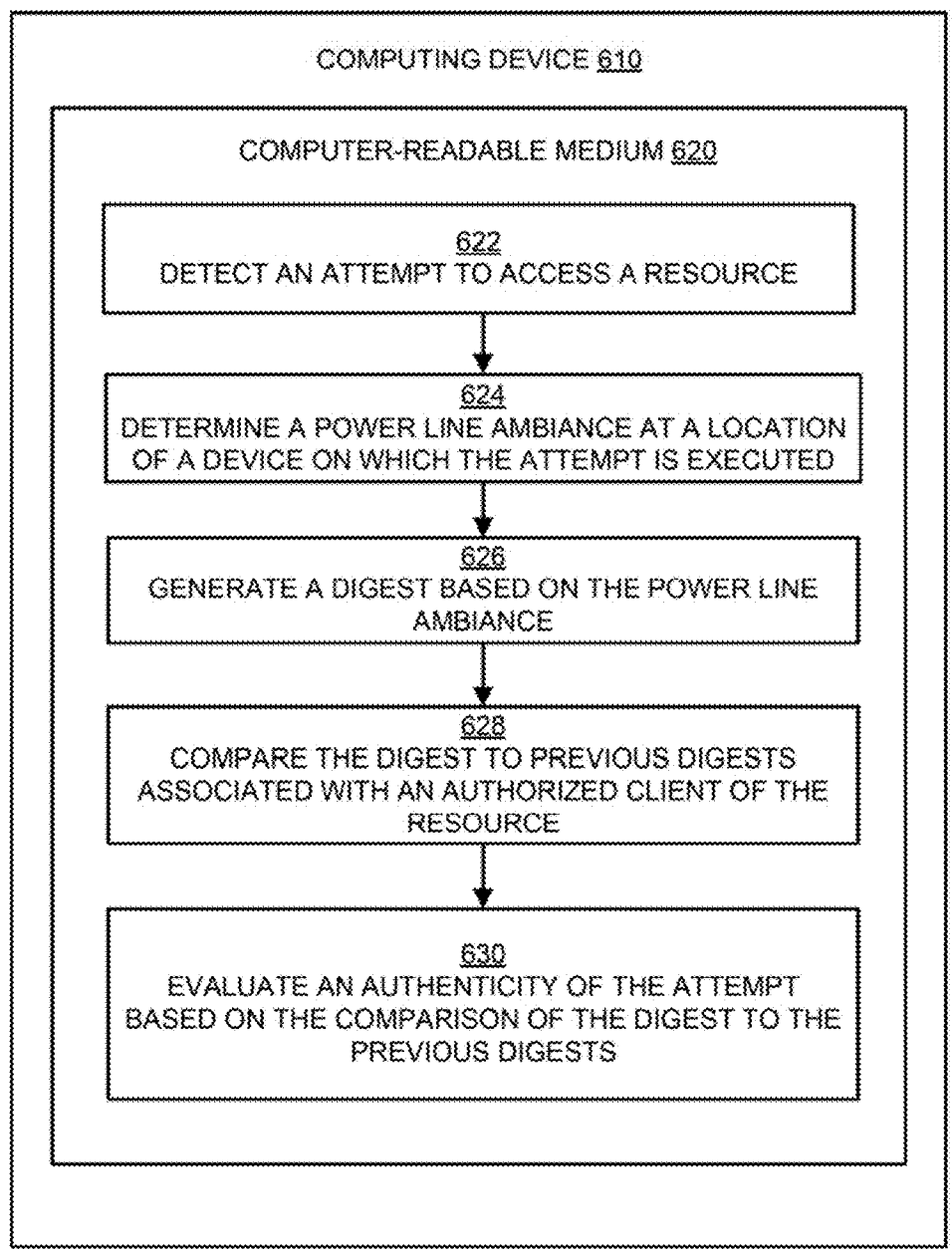
FIG. 6 is a flow diagram illustrating an example method to implement intrusion detection based on smart power background that may be performed by a computing device such as the computing device in FIG. 5.

FIG. 6 is a flow diagram illustrating an example method to implement intrusion detection based on smart power background that may be performed by a computing device such as the computing device in FIG. 5, arranged in accordance with at least some embodiments described herein.

Example methods may include one or more operations, functions or actions as illustrated by one or more of blocks 622, 624, 626, 628, and 630. The operations described in the blocks 622 through 630 may also be stored as computer-executable instructions in a computer-readable medium such as a computer-readable medium 620 of a computing device 610.

An example process for establishing secure communications to manage components of a control system may begin with block 622, "DETECT AN ATTEMPT TO ACCESS A RESOURCE," where an IDS, for example, may detect an activation of a website login. The IDS may reside in a telecommunications network coupled to a power grid server and/or smart meter.

Block 622 may be followed by block 624, "DETERMINE A POWER LINE AMBIANCE AT A LOCATION OF A DEVICE ON WHICH THE ATTEMPT IS EXECUTED," where the power grid server and/or smart meter may determine the power line ambiance at the location of the device on which the attempt to access the resource is being executed. The power line ambiance may be based on a connection of one or more devices, including the device on which the attempt to access the resource is being executed, to a power line through the smart meter. The power line ambiance may be determined from power profiles captured from the devices enabling passive and/or active identification of smart and/or non-smart device signatures.

Block 624 may be followed by block 626, "GENERATE A DIGEST BASED ON THE POWER LINE AMBIANCE," where the digest, associated with the location of the device on which the attempt to access the resource is being executed, may be generated by the power grid server and/or the smart meter using the smart and/or non-smart device signatures identified from the captured power profiles of the devices connected to the power line. The digest may then be provided to an IDS.

Block 626 may be followed by block 628, "COMPARE THE DIGEST TO PREVIOUS DIGESTS ASSOCIATED WITH AN AUTHORIZED CLIENT OF THE RESOURCE," where the digest may be compared to previous digests received by the IDS associated with an authorized client of the resource that is attempting to be accessed. The previous digests associated with the authorized client may be from a home, a work place, a neighborhood, or a city. If the digest is unrecognizable following comparison with the previous digests associated with the authorized client, the digest may further be compared to previous digests associated with predefined locations stored in a search engine database within the IDS. The previous digests of the predefined locations may be from a company, a hotel, an airport, a train station, a meeting place, a healthcare facility, an educational facility, or other location in which an attempt to access a resource may be made.

Block 628 may be followed by block 630, "EVALUATE AN AUTHENTICITY OF THE ATTEMPT BASED ON THE COMPARISON OF THE DIGEST TO THE PREVIOUS DIGESTS," where the comparison of the digest to the previous digests associated with the authorized client of the resource and/or previous digests associated with the pre-defined locations may be used to generate an evaluation of the authenticity of the attempt to access the resource. If the evaluation concludes the authenticity of the attempt is suspicious, the IDS may elevate security by implementing one or more levels of verification and/or authentication techniques. For example, the IDS may retrieve and evaluate external information associated with the location of the device on which the attempt to access the resource is being executed, where the IDS may prompt a user attempting to access the resource to provide the external information. The IDS may also compare digests for a plurality of users attempting to access the resource from a same location. The IDS may further combine the verification levels with the authentication techniques, such as a password, a characterization of typing speed and delays, a location of Internet Protocol (IP) address, or other authentication technique.

The blocks included in the above described process are for illustration purposes. Intrusion detection based on smart power background may be implemented by similar processes with fewer or additional blocks. In some embodiments, the blocks may be performed in a different order. In some other embodiments, various blocks may be eliminated. In still other embodiments, various blocks may be divided into additional blocks, or combined together into fewer blocks.

Figure 7:
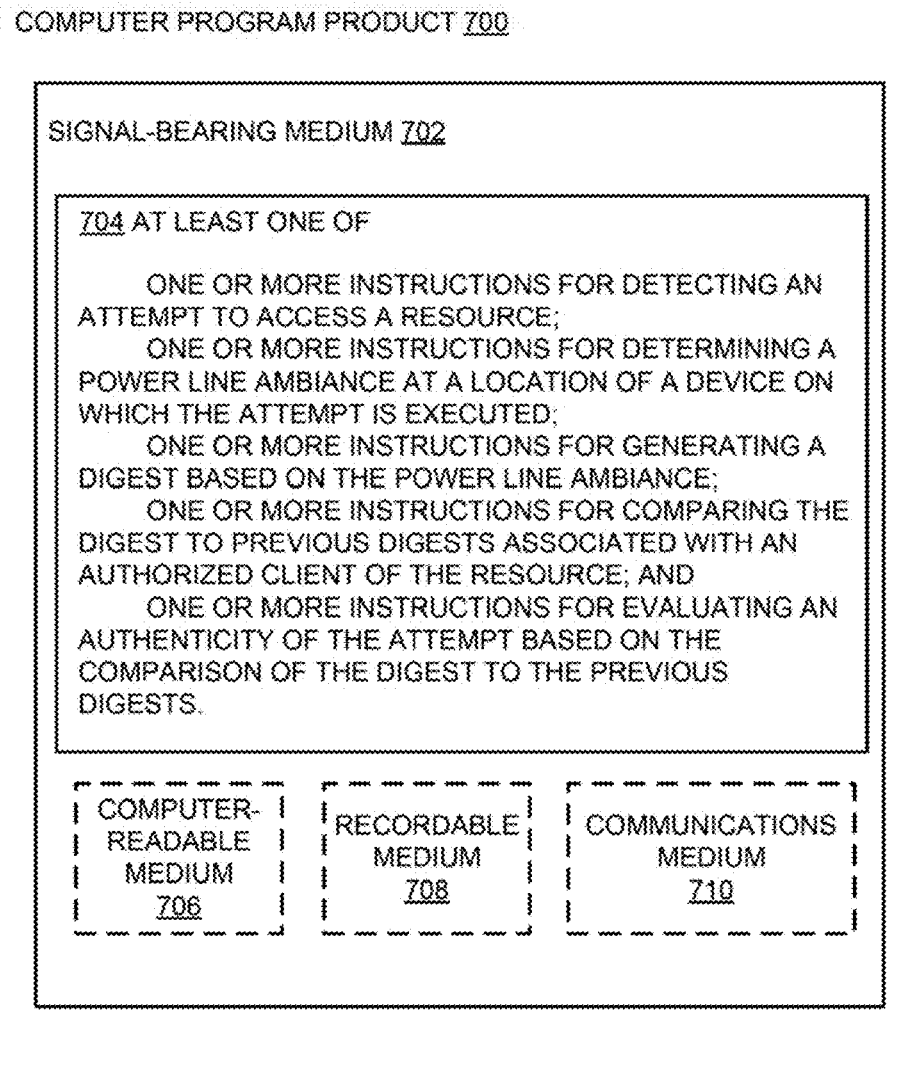
FIG. 7 illustrates a block diagram of an example computer program product, all arranged in accordance with at least some embodiments described herein.

FIG. 7 illustrates a block diagram of an example computer program product, arranged in accordance with at least some embodiments described herein.

In some embodiments, as shown in FIG. 7, the computer program product 700 may include a signal bearing medium 702 that may also include one or more machine readable instructions 704 that, when executed by, for example, a processor, may provide the functionality described herein. Thus, for example, referring to the processor 504 in FIG. 5, a capturing module 526 executed on the processor 504 may undertake one or more of the tasks shown in FIG. 7 in response to the instructions 704 conveyed to the processor 504 by the signal bearing medium 702 to perform actions associated with establishing secure communications to manage components of a control system as described herein. Some of those instructions may include, for example, instructions for detecting an attempt to access a resource, determining a power line ambiance at a location of a device on which the attempt is executed, generating a digest based on the power line ambiance, comparing the digest to previous digests associated with an authorized client of the resource, and for evaluating an authenticity of the attempt based on the comparison of the digest to the previous digests, according to some embodiments described herein.

In some implementations, the signal bearing medium 702 depicted in FIG. 7 may encompass a computer-readable medium 706, such as, but not limited to, a hard disk drive (HDD), a solid state drive (SSD), a Compact Disc (CD), a Digital Versatile Disk (DVD), a digital tape, memory, etc. In some implementations, the signal bearing medium 702 may encompass a recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (e.g., a fiber optic cable, a waveguide, a wired communication link, a wireless communication link, etc.). Thus, for example, the computer program product 700 may be conveyed to one or more modules of the processor 504 of FIG. 5 by an RF signal bearing medium, where the signal bearing medium 702 is conveyed by the wireless communications medium 710 (e.g., a wireless communications medium conforming with the IEEE 802.11 standard).

According to some examples, a method to implement intrusion detection may be provided. An example method may include determining a power line ambiance at a location of a device on which an attempt to access a resource is executed, the power line ambiance based on a connection of the device and one or more other devices to a power line. The method may also include generating a digest based on the power line ambiance, where the digest may allow for authentication of the attempt to access the resource.

In other examples, determining the power line ambiance may include capturing power profiles of the one or more other devices and/or the device at the location of the device on which the attempt to access the resource is executed. Determining the power line ambiance may also include identifying smart and/or non-smart device signatures from the captured power profiles passively by using power consumption data. Determining the power line ambiance may further include identifying smart and/or non-smart device signatures from the captured power profiles actively by using impulse response data. Digests for a plurality of predefined locations may be generated, where the predefined locations may include a hotel, an airport, a meeting place, a healthcare facility, an educational facility, or a train station.

According to some embodiments, a method to implement intrusion detection based on smart power background is provided. An example method may include detecting an attempt to access a resource and receiving a digest associated with a location of a device on which the attempt to access the resource is executed. The method may also include comparing the received digest to previous digests associated with an authorized client of the resource and evaluating an authenticity of the attempt based on the comparison of the digest to the previous digests associated with the authorized client of the resource.

In other embodiments detecting the attempt to access the resource may include detecting an activation of a web login session. The previous digests associated with the authorized client of the resource may be a home, an office, a neighborhood, or a city. Previously generated digests for a plurality of predefined locations may be stored in a database, where the predefined locations may include a hotel, an airport, a meeting place, a healthcare facility, an educational facility, or a train station. The digest may be further compared to the previous digests of the predefined locations in response to determination that the digest is unrecognizable after comparison with the previous digests associated with the authorized client of the resource.

In further embodiments, evaluating the authenticity of the attempt may further include receiving external information and verifying the location of the device on which the attempt to access the resource is executed based on the external information. The external information may include a weather information associated with the location, a power event associated with the location, and/or power signatures of one or more devices known to be at the location. A user attempting to access the resource may be prompted to provide the external information. Prompting the user attempting to access the resource to provide the external information may include prompting the user to activate a device with a known power signature coupled to a power line.

In yet further embodiments, digests of a plurality of users attempting to access the resource from a same location may be compared to evaluate the authenticity of the attempt. The authenticity of the attempt may be evaluated in combination with one or more authentication techniques and using one or more verification levels. The verification levels may include comparison of the digest to the previous digests associated with an authorized client of the resource and/or previous digests associated with predefined locations, retrieval and evaluation of external information associated with the location of the device on which the attempt to access the resource is executed, prompting of a user attempting to access the resource to provide the external information, and comparison of digests for a plurality of users attempting to access the resource from a same location.

According to some examples, a system to implement intrusion detection is described. An example system may include a smart meter and a power grid server coupled to the smart meter. The power grid server may be configured to determine a power line ambiance at a location of a device on which an attempt to access a resource is executed, the power line ambiance based on a connection of the device and one or more other devices to a power line through the smart meter. The power grid server may also be configured to generate a digest based on the power line ambiance, where the digest allows for authentication of the attempt to access the resource.

In other examples, power profiles of the device and the one or more other devices may be captured to determine the power line ambiance at the location of the device on which the attempt to access the resource is executed. Smart and/or non-smart device signatures may be identified from the captured power profiles passively by using power consumption data to determine the power line ambiance. Smart and/or non-smart device signatures may also be identified from the captured power profiles actively by using impulse response data to determine the power line ambiance. Digests may be generated for a plurality of predefined locations including a hotel, an airport, a meeting place, a healthcare facility, an educational facility, and/or a train station.

According to other embodiments, a system to implement intrusion detection based on smart power background is described. The example system may include one or more servers of an intrusion detection system (IDS) configured to communicate with a device, a smart meter, and/or a power grid server. The servers of the IDS may be configured to detect an attempt to access a resource and receive a digest associated with a location of a device on which the attempt to access the resource is executed. The servers of the IDS may be also configured to compare the received digest to previous digests associated with an authorized client of the resource and evaluate an authenticity of the attempt based on a comparison of the digest to the previous digests associated with the authorized client of the resource.

In other embodiments, the servers of the IDS may be configured to detect the attempt to access the resource through an activation of a web login session. Previously generated digests for a plurality of predefined locations may be stored in a database, where the predefined locations may include a hotel, an airport, a meeting place, a healthcare facility, an educational facility, or a train station. The received digest may be further compared to the previous digests associated with the predefined locations in response to determination that the digest is unrecognizable after comparison with the previous digests associated with the authorized client of the resource.

In further embodiments, to evaluate the authenticity of the attempt, the servers of the IDS may receive external information and verify the location of the device on which the attempt to access the resource is executed based on the external information. The external information may include a weather information associated with the location, a power event associated with the location, and/or power signatures of one or more devices known to be at the location. The servers of the IDS may be further configured to prompt a user attempting to access the resource to provide the external information, where the servers of the IDS may be configured to prompt the user to provide the external information by activating a device with a known power signature coupled to a power line.

In yet further embodiments, the servers of the IDS may be configured to evaluate the authenticity of the attempt further by comparing digests of a plurality of users attempting to access the resource from a same location. The servers of the IDS may be configured to evaluate the authenticity of the attempt in combination with one or more authentication techniques.

The authentication techniques may include a password, an asserted identity, a characterization of typing speed and delays, a location of Internet Protocol (IP) address, hardware fingerprinting, local weather events, local power events, and/or activation of one or more previously associated devices or appliances of a known power signature. The servers of the IDS may be configured to evaluate the authenticity of the attempt using one or more verification levels. The verification levels may include comparison of the digest to the previous digests associated with the authorized client and/or previous digests associated with predefined locations, retrieval and evaluation of external information associated with the location of the device on which the attempt to access the resource is executed, prompting of a user attempting to access the resource to provide the external information, and/or comparison of digests for a plurality of users attempting to access the resource from a same location.

According to some embodiments, a computer-readable memory device with instructions stored thereon is described, which when executed on one or more computing devices may execute a method to implement intrusion detection. The method may be similar to the example methods provided above.

According to other embodiments, a computer-readable memory device with instructions stored thereon is described, which when executed on one or more computing devices may execute a method to implement intrusion detection based on smart power background. The method may be similar to the example methods provided above.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various examples of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular examples described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a Compact Disc (CD), a Digital Versatile Disk (DVD), a digital tape, a computer memory, a solid state drive (SSD), etc., and a transmission type medium such as a digital and/or an analog communication medium (e.g., a fiber optic cable, a waveguide, a wired communication link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical client interfaces, and applications programs, one or more interaction devices, such as a touch pad or screen, and/or control systems including feedback loops and control motors.

A typical data processing system may be implemented utilizing any suitable commercially available components, such as those typically found in intrusion detection systems and smart power systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to implement intrusion detection, the method comprising:
   determining a power line ambiance at a location of a device on which an attempt to access a resource is executed, wherein the power line ambiance is based on a connection of the device and one or more other devices to a power line;
   generating a digest associated with the location of the device based on the power line ambiance, wherein the digest comprises smart and/or non-smart device signatures identified from the power line ambiance; and
   providing the digest to one or more servers of an intrusion detection system (IDS), wherein the digest is employed to authenticate the attempt to access the resource through:
   a comparison of the digest to previous digests associated with an authorized client of the resource, and a comparison of the digest to a list of previously generated digests for a plurality of particular locations stored in a database, in response to a determination that the digest is unrecognizable, subsequent to the comparison with the previous digests associated with the authorized client of the resource.

2. The method of claim 1, wherein determining the power line ambiance comprises:
capturing power profiles of the one or more other devices and/or the device at the location of the device on which the attempt to access the resource is executed.

3. The method of claim 2, wherein determining the power line ambiance comprises:
passively identifying the smart and/or non-smart device signatures from the captured power profiles by using power consumption data.

4. The method of claim 2, wherein determining the power line ambiance comprises:
actively identifying the smart and/or non-smart device signatures from the captured power profiles by using impulse response data.

5. The method of claim 1, wherein determining the power line ambiance comprises:
determining the power line ambiance in response to a request from the IDS.

6. The method of claim 1, wherein the digest is further employed to authenticate the attempt to access the resource through a comparison of the digest to digests of a plurality of users, which attempt to access the resource from a location that is same as the location of the device on which the attempt to access the resource is executed.

7. The method of claim 1, wherein the digest is employed in combination with one or more authentication techniques to authenticate the attempt to access the resource, in response to a determination that the attempt is suspicious.

8. The method of claim 7, wherein the one or more authentication techniques include one or more of: a password, an asserted identity, a characterization of typing speed and delays, a location of internet protocol (IP) address, hardware fingerprinting, local weather events, local power events, and activation of one or more previously associated devices or appliances of a known power signature.

9. The method of claim 1, wherein the digest is employed to authenticate the attempt to access the resource using one or more verification levels in response to a determination that the attempt is suspicious.

10. The method of claim 9, wherein the one or more verification levels include the comparison of the digest to the previous digests associated with the authorized client and/or the comparison of the digest to the list of previously generated digests for the plurality of particular locations, retrieval and evaluation of external information associated with the location of the device on which the attempt to access the resource is executed, prompting a user that attempts to access the resource to provide the external information, and comparison of digests for a plurality of users, which attempt to access the resource from a same location.

11. A system to implement intrusion detection, the system comprising:
a smart meter;
a power grid server communicatively coupled to the smart meter, wherein the power grid server comprises:
a communication module configured to facilitate communication between the power grid server and the smart meter over a network;
a memory configured to store instructions; and
a processor coupled to the memory, wherein the processor, in conjunction with the stored instructions, is configured to perform or cause to be performed:
determine a power line ambiance at a location of a device on which an attempt to access a resource is executed, wherein the power line ambiance is based on a connection of the device and one or more other devices to a power line through the smart meter;
generate a digest associated with the location of the device based on the power line ambiance, wherein the digest comprises smart and/or non-smart device signatures identified from the power line ambiance; and
provide the digest to one or more servers of an intrusion detection system (IDS) communicatively coupled to the power grid server, wherein the digest is employed to authenticate the attempt to access the resource through:
a comparison of the digest to previous digests associated with an authorized client of the resource, and
a comparison of the digest to a list of previously generated digests for a plurality of particular locations stored in a database, in response to a determination that the digest is unrecognizable, subsequent to the comparison with the previous digests associated with the authorized client of the resource,
wherein the digest is employed in combination with one or more authentication techniques to authenticate the attempt to access the resource, in response to a determination that the attempt is suspicious, and
wherein the one or more authentication techniques include one or more of: a password, an asserted identity, a characterization of typing speed and delays, a location of internet protocol (IP) address, hardware fingerprinting, local weather events, local power events, and activation of one or more previously associated devices or appliances of a known power signature.

12. The system of claim 11, wherein the power line ambiance includes a power profile of the location of the device on which the attempt to access the resource is executed.

13. The system of claim 12, wherein the power profile includes one or more of: an identification of the device that contributes to the power line ambiance, power consumption of the one or more other devices connected to the power line at the location, a noise associated with the device that contributes to the power line ambiance, transmission patterns, and other characteristics associated with the connection of the device that contributes to the power line ambiance.

14. The system of claim 11, wherein the power grid server is part of a power grid network that is configured to supply power to the device and the one or more other devices.

15. The system of claim 14, wherein an amount of power supplied by the power grid network to each of the device and the one or more other devices is distinct, which enables each device to have a unique device signature.

16. The system of claim 15, wherein the amount of power supplied by the power grid network to each of the device and the one or more other devices is based on one or more of: a type of a particular device, how much power the particular device consumes, and usage of the particular device.

17. A non-transitory computer-readable memory device with instructions stored thereon that, in response to execution by one or more processors, cause the one or more processors to implement intrusion detection by performance or control of performance of operations to:

determine a power line ambiance at a location of a device on which an attempt to access a resource is executed, wherein the power line ambiance is based on a connection of the device and one or more other devices to a power line;

generate a digest associated with the location of the device based on the power line ambiance, wherein the digest comprises smart and/or non-smart device signatures identified from the power line ambiance;

provide the digest to one or more servers of an intrusion detection system (IDS), wherein the digest is employed to authenticate the attempt to access the resource through:

a comparison of the digest to previous digests associated with an authorized client of the resource, and a comparison of the digest to a list of previously generated digests for a plurality of particular locations stored in a database, in response to a determination that the digest is unrecognizable, subsequent to the comparison with the previous digests associated with the authorized client of the resource; and store the digest in the database as a digest associated with the authorized client of the resource, in response to a determination that the attempt to access the resource is authentic.

18. The non-transitory computer-readable memory device of claim 17, wherein the power line ambiance is determined in response to a request from the IDS, and wherein the IDS sends the request in response to a detection of the attempt to access the resource on the device.

19. The non-transitory computer-readable memory device of claim 17, wherein the previous digests associated with the authorized client of the resource are one of: a home, an office, a neighborhood, and a city.

20. The non-transitory computer-readable memory device of claim 17, wherein the particular locations include a hotel, an airport, a meeting place, a healthcare facility, an educational facility, or a train station.

\* \* \* \* \*